(12) United States Patent
Craig et al.

(10) Patent No.: US 9,576,280 B2
(45) Date of Patent: Feb. 21, 2017

(54) METHOD AND SYSTEM FOR MAKING ELECTRONIC PAYMENTS

(71) Applicant: SELEUCID, LLC, Louisville, KY (US)

(72) Inventors: Edward Craig, Prospect, KY (US); Premal V Patel, The Woodlands, TX (US); Rebecca Burch, Prospect, KY (US)

(73) Assignee: SELEUCID, LLC, Louisville, KY (US)

( * ) Notice: Subject to any disclaimer, the term of this patent is extended or adjusted under 35 U.S.C. 154(b) by 574 days.

(21) Appl. No.: 14/052,756

(22) Filed: Oct. 13, 2013

(65) Prior Publication Data

US 2015/0106215 A1  Apr. 16, 2015

(51) Int. Cl.
*G06Q 20/20* (2012.01)
*G06Q 20/22* (2012.01)
*G06Q 20/34* (2012.01)

(52) U.S. Cl.
CPC .......... *G06Q 20/202* (2013.01); *G06Q 20/204* (2013.01); *G06Q 20/22* (2013.01); *G06Q 20/347* (2013.01); *G06Q 20/357* (2013.01)

(58) Field of Classification Search
None
See application file for complete search history.

(56) References Cited

U.S. PATENT DOCUMENTS

| 5,924,080 | A  | * | 7/1999  | Johnson | G06Q 20/20 235/380 |
|---|---|---|---|---|---|
| 7,648,067 | B2 |   | 1/2010  | Nobutani |  |
| 7,810,720 | B2 |   | 10/2010 | Lovett |  |
| 8,016,187 | B2 |   | 9/2011  | Frantz et al. |  |
| 8,249,967 | B2 |   | 8/2012  | Park et al. |  |
| 8,380,177 | B2 |   | 2/2013  | Laracey |  |
| 8,447,660 | B2 |   | 5/2013  | Takagi |  |
| 2006/0264201 | A1 | * | 11/2006 | Zhang | H04L 29/12783 455/411 |
| 2007/0194123 | A1 |   | 8/2007  | Frantz et al. |  |
| 2008/0114699 | A1 | * | 5/2008  | Yuan | G06Q 20/0855 705/78 |
| 2011/0246558 | A1 | * | 10/2011 | Shenfield | H04L 12/5885 709/203 |
| 2012/0253914 | A1 | * | 10/2012 | Black | G06Q 30/02 705/14.28 |

FOREIGN PATENT DOCUMENTS

WO  WO/2007/137336 A1  12/2007

* cited by examiner

*Primary Examiner* — Allen Chein
(74) *Attorney, Agent, or Firm* — Steve Witters; Witters & Associates

(57) ABSTRACT

A method and system for making electronic payments is disclosed herein. The method for making a payment for items being purchased by a customer at a point of sale comprises acquiring and sending a payment pending notification comprising an account number of the customer and a first terminal identification number to a host system. A payment request comprising a total cost of the items, a second terminal identification number, and a control bank card number is then acquired and sent to the host system. The host system associates the customer's account in the host system with the purchase by correlating the first terminal identification number with the second terminal identification number. A payment decision using information in the customer's account is made with the host system and is sent to the point of sale, where the transaction is closed. A system configured to perform the method is also provided.

10 Claims, 8 Drawing Sheets

METHOD AND SYSTEM FOR MAKING ELECTRONIC PAYMENTS

FIELD OF THE DISCLOSURE

This disclosure relates generally to electronic payment methods and systems.

BACKGROUND

The background information is believed, at the time of the filing of this patent application, to adequately provide background information for this patent application. However, the background information may not be completely applicable to the claims as originally filed in this patent application, as amended during prosecution of this patent application, and as ultimately allowed in any patent issuing from this patent application. Therefore, any statements made relating to the background information are not intended to limit the claims in any manner and should not be interpreted as limiting the claims in any manner.

Electronic Funds Transfer Point of Sale (EFTPOS) systems have operated for many years. An EFTPOS system is an electronic payment system involving electronic funds transfers based on the use of payment cards, such as debit or credit cards, at terminals located at points of sale. The terminals typically provide a means for entering personal account data into the system. Terminals typically include a magnetic stripe reading device and a keypad integrated with an EFTPOS terminal located at the point of sale. The keypad may provide a customer making a purchase the ability to enter their personal identification number (PIN) associated with their credit or debit card. When making a purchase, a merchant or vendor rings up a total cost of items being purchased and the customer is asked to tender payment. The customer may then swipe their credit or debit card through the magnetic stripe reading device and enter their PIN. The personal account data read from the payment card, PIN, merchant ID/terminal ID, and the total cost of items being purchased are electronically sent to the customer's card issuer for payment with the EFTPOS system.

Many merchants have other electronic point of sale systems in place as well. For example, many merchants have an advertising system and/or a loyalty program system in addition to an EFPTOS system. Many grocery stores, fuel stations, and other stores and restaurants have loyalty programs. Typically, a loyalty program involves the merchant providing incentives to its customers to shop with the merchant, such as in the form of discounts, coupons, or other rewards and incentives. Typically, each customer is given a unique identification loyalty card having a barcode. The customer scans their barcode when making a purchase and their identification information scanned from the barcode and information about the items being purchased is collected. In this way, loyalty programs allow merchants to collect information about their customers' shopping habits and provide rewards accordingly. In addition to rewards and incentives with the loyalty program, advertising systems may provide for sending targeted advertisements to customers, taking into account the collected information about the items being purchased by the customer.

EFTPOS and the other electronic point of sale systems, such as advertising and loyalty program systems, are typically separate systems using separate and different input devices at the point of sale. Consequently, these separate systems typically require additional steps to be taken by a customer making a purchase at the point of sale.

SUMMARY

In at least one embodiment of the present disclosure, a method for making a payment for items being purchased by a customer at a point of sale is provided. The method comprises the steps of: a) acquiring and sending a payment pending notification comprising an account number of the customer and a first terminal identification number to a host system, with a first data transfer system; b) acquiring and sending a payment request comprising a total cost of the items, a second terminal identification number, and a control bank card number to the host system, with a second data transfer system; c) associating a customer's account with the purchase by correlating the first terminal identification number with the second terminal identification number, with the host system; d) making a payment decision using information in the customer's account, with the host system; e) sending the payment decision to the point of sale, with the second data transfer system; and f) closing the transaction at the point of sale.

In at least one other embodiment of the present disclosure, a system configured for making a payment for items being purchased by a customer at a point of sale is provided. The system comprises a point of sale payment system having a magnetic stripe reader, a register, a personal identification key pad, and a barcode scanner. An electronic payment peripheral device is provided in data communication with the point of sale system and is configured to acquire and send a payment pending notification to a host system. A host system is configured to receive the payment pending notification and to receive a payment request. The host system is configured to associate the customer's account with the purchase by correlating the payment pending notification with the payment request, make a payment decision using information in the customer's account, and send the payment decision to the point of sale.

In at least one additional embodiment of the present disclosure, a method for making payments for items being purchased by customers at points of sale is provided. Each purchase by each customer at each point of sale comprising the steps of: a) acquiring and sending a payment pending notification comprising an account number of the customer and a first terminal identification number to a host system, with a first data transfer system; b) acquiring and sending a payment request comprising a total cost of the items, a second terminal identification number, and a control bank card number to the host system, with a second data transfer system; c) associating a customer's account with the purchase by correlating the first terminal identification number with the second terminal identification number, with the host system; d) making a payment decision using information in the customer's account, with the host system; e) sending the payment decision to the point of sale, with the second data transfer system; and f) closing the transaction at the point of sale. Each account number of each customer may be different and each first terminal identification number may be the same for each same point of sale and different for each different point of sale. Each control bank card number may be the same and each second terminal identification number may be the same for each same point of sale and different for each different point of sale.

In at least one further embodiment of the present disclosure, an electronic payment peripheral device is provided. The electronic payment peripheral device comprises a microprocessor and memory and is configured to communicate with a barcode reader and to acquire and send a payment pending notification with a first data transfer system to a host system.

BRIEF DESCRIPTIONS OF THE DRAWINGS

The following figures, which are idealized, are not to scale and are intended to be merely illustrative of aspects and embodiments of the present disclosure and non-limiting. The drawings are briefly described as follows.

DETAILED DESCRIPTION

Figure 1:
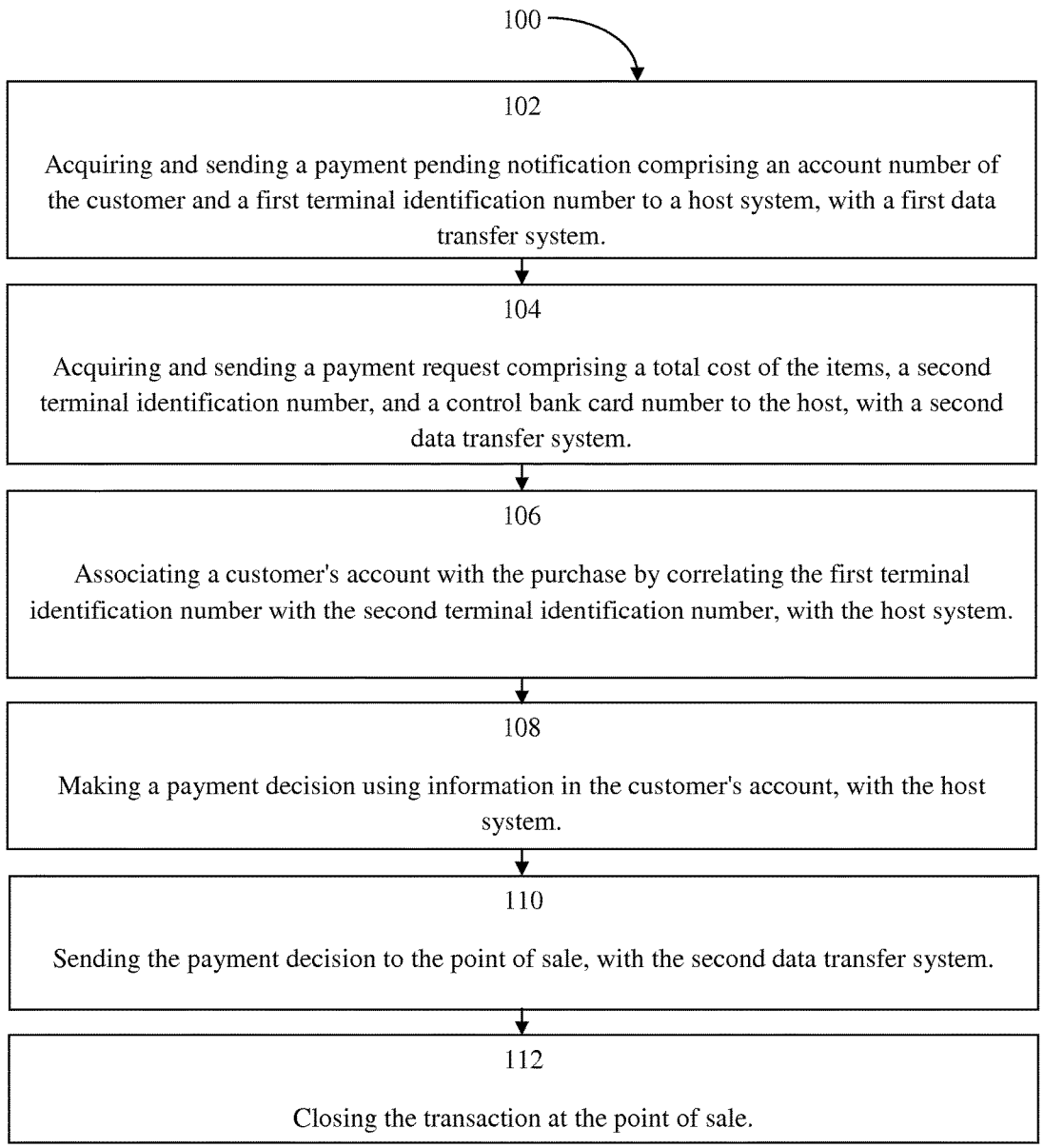
FIG. 1 is a flow diagram showing a method for making a payment for items being purchased by a customer at a point of sale.

The present disclosure relates to payment transactions, for example a payment by a customer to a merchant, such as in a retail store, that accepts payment cards such as credit, debit, or gift cards for the payment of goods and/or services. The merchant may have a preexisting point of sale (POS) register that uses barcode scanning to determine the value of goods and/or services being purchased by a customer. In at least one embodiment of the present disclosure, a method and system for making electronic payments with a barcode presented or rendered by the customer is provided herein.

Typical barcode/register systems may be used for entering products and/or services to be purchased by a customer and determining the purchase price or total cost of the items, and associated tax if any. Some barcode/register systems may provide reports that provide cash control and inventory management among other things. A barcode/register may also accept barcoded coupons which may reduce the amount or cost of the items purchased by looking up the discount amount in a table of acceptable coupons and discounting an item being purchased prior to totaling a sale.

POS payment systems at the vast majority of merchant points of sale use magnetic strip readers to determine the account and other account holder information necessary to obtain authorization for payment using electronic communications through an electronic funds at point of sale system data transfer network, EFTPOS system, to a card issuing bank for approval after a POS sale is totaled. While there are other card data storage solutions such as radio-frequency identification (RFID) and smartcard chips, few merchant points of sale may be equipped to accept non-magnetic stripe cards and the vast majority of account holders or customers may have only magnetic striped plastic card for payment. Currently, few POS payment systems, if any, have barcode readers configured to obtain barcode payment account holder data. Most POS register systems close a sale when they receive an appropriate electronic signal back from an EFTPOS system authorizing submitted account holder data and an amount provided by the register system for the sale including any applicable tax.

Currently most barcode/register systems are used to process the entry of the sale, such as totaling items to be purchased, while POS payment systems are used to accept payment for the items. Therefore, the typical barcode/register system and the POS payment system at a merchant site are two separate systems that provide two different functions. Specifically, most merchant points of sale barcode readers are not interfaced with POS payment systems to provide data to these systems in a format and protocol that may be require to effect a POS payment. Therefore, a barcode based payment may not be currently provided by merchants since their barcode reader may not be interfaced to a POS payment system.

Currently, if a merchant were to add a barcode payment system they would likely be required to add this as a system separate from their preexisting POS system. Typically, merchants must have tight reconciliation processes for controlling cash flow and these process may be frustrated for a variety of reasons, for example potential employee theft. Adding another payment method or system that does not use the preexisting merchant POS and/or EFTPOS payment systems settlement methods and associated accounting controls may add cost and risk to merchants. Also, unlike debit cards that require Personal Identification Number (PIN) entry, many barcode based payment systems may not be practical since they may not interface with merchant's preexisting POS payment system and therefore the POS payment system may not interface with a PIN entry terminal to be able to obtain PIN entry. This lack of interface may pose problems in the area of Regulation E and Regulation D requirements related to consumer signature/PIN approval for card related sales and the receipt for these sales.

Having thus introduced background on methods and systems for making electronic payments, we now turn to features that are provided by this disclosure. Technologies are generally described for methods and systems for making electronic payments. Various terms are disclosed herein to describe the presently disclosed method and system for making electronic payments. As used herein, a "control bank card number" is a number that is identifiable with a barcode payment service provider. In at least one embodiment, the control bank card number is identifiable with a data transfer system, such as an EFTPOS system, as a payment card such as a debit, credit, or stored value card, for example. In at least one other embodiment, the control bank card number is the same number for a plurality of merchants, or even all merchants. The control bank card number may not solely be identifiable with any customer or any customer's account. As used herein, a "customer's account number" is a number that is unique to each customer and is identifiable with the customer's account maintained by the barcode payment service provider. In at least one embodiment of the present disclosure, a method for making a payment for items being purchased by a customer at a point of sale using a barcode is provided. In at least one other embodiment of the present disclosure, a method for making a payment for items being purchased by a customer at a point of sale integrated with at least one preexisting system and/or device is provided. For example, embodiments of the presently method and device may be incorporated with a preexisting EFTPOS network, such as STAR® EFTPOS network, First Data Corporation, 5565 Glenridge Connector NE, Suite 2000, Atlanta, Ga. 30342.

Reference will now be made in more detail to the present embodiments and aspects of the present disclosure, examples of which are illustrated in the accompanying figures. FIG. 1 shows method 100 for making a payment for items being purchased by a customer at a point of sale. In step 102 a payment pending notification comprising an account number of the customer and a first terminal identification number is acquired and sent to a host system, with a first data transfer system. The account number of the customer may be acquired in a variety of ways as are known in the art. In at least one embodiment of the present disclosure, the account number of the customer is acquired by electronically reading a barcode or other image and electronically acquiring the account number of the customer from the barcode or other image. However, other and different means for acquiring the account number of the customer as known in the art may be used with the presently disclosed method and system. For example, an account number of the customer may be simply keyed into the system with a key pad, or acquired from other card data storage solutions such as RFID and smartcard chips, for example.

In at least one embodiment of the present disclosure, the first terminal identification number is stored in a POS system or an electronic payment peripheral device in data communication with the POS system. In at least one other embodiment of the present disclosure, the payment pending notification consists solely of the account number of the customer and the first terminal identification number. In at least one additional embodiment, the payment pending notification is void of a personal identification number of the customer, a total cost of the items, and/or a control bank card number.

In Step 104, a payment request comprising a total cost of the items, a second terminal identification number, and a control bank card number is acquired and sent to the host system, with a second data transfer system. The total cost of the items may be acquired by reading or scanning barcodes on the goods and/or services at the POS. The second terminal identification number may be the same or different from the first terminal identification number and may be stored in a POS system or in an electronic payment peripheral device in data communication with the POS system.

The control bank card number may be acquired in a variety of ways as are known in the art. In at least one embodiment of the present disclosure, the control bank card number is acquired by swiping or reading a magnetic stripe on a control card at the POS with a magnetic stripe reader. However, other and different means for acquiring the control bank card number as known in the art may be used with the presently disclosed method and system. For example, a control bank card number may be simply keyed into the system with a key pad, acquired from other card data storage solutions such as RFID and smartcard chips, or by electronically reading an image and electronically acquiring the control bank card number from the image, for example.

The second data transfer system may be the same as or different from the first data transfer system. For example, the first and second terminal identification numbers may be the same and the payment request may be sent directly to the host system. In at least one other embodiment, the first and second terminal identification numbers are different and the payment request may be routed through an EFTPOS system data transfer network when being sent to the host system. In at least one embodiment, the payment request may consist solely of the total cost of the items, the second terminal identification number, the control bank card number, and optionally a PIN. In at least one additional embodiment, the payment request is void of the account number of the customer and may not solely be associated with a customer.

In Step 106, a customer's account in the host system is associated with the purchase by correlating the first terminal identification number with the second terminal identification number, with the host system. In an embodiment where the first and the second terminal identification numbers are different, the host system may correlate the first terminal identification number with the second terminal identification number by accessing a database having the first and second terminal identification numbers in fields of a record, or by other database functions as are known in the art, and associating the customer's account with the terminal identification numbers using a database function. In an embodiment where the first and the second terminal identification numbers are the same, the host system may simply match the first terminal identification number with the second terminal identification number and associate the customer's account with the terminal identification numbers using a database function.

In Step 108 a payment decision is made using information in the customer's account, with the host system. The payment decision may be based on information in the customer's account such as a balance in the customer's account, the customer's credit limit, or verification of a PIN, for example.

In Step 110, a payment decision is sent to the point of sale from the host system, with the second data transfer system. In an embodiment where the first and second data transfer systems are the same, the payment decision may be sent directly from the host system to the POS. In at least one embodiment, the first and second data transfer systems are different and the payment decision is routed through an EFTPOS system data transfer network.

The transaction is closed at the point of sale in Step 112. Closing the transaction may further comprise debiting the customer's account and crediting an account associated with the point of sale. Both or one of crediting and depositing may be done periodically and in any order. For example, an EFTPOS account or an account of the merchant receiving the payment for the purchased items may be associated with the point of sale which may be associated with the first and/or second terminal identification number. The customer's account may be debited immediately or periodically and the merchant's or EFTPOS account may be credited immediately or periodically. Periodically comprises debiting or crediting daily, hourly, or per transaction or per group of transactions, for example.

Figure 2:
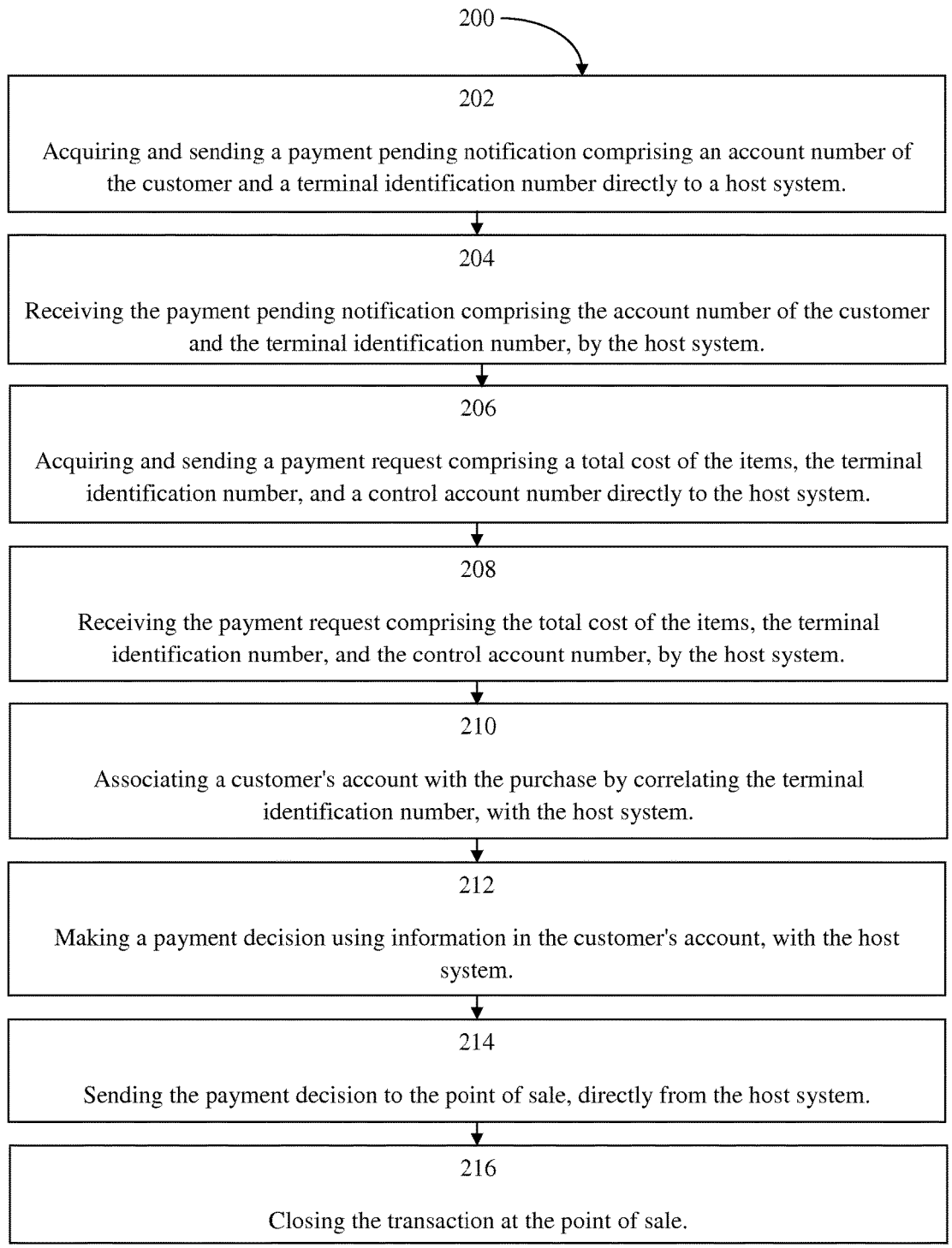
FIG. 2 is a flow diagram showing a method for making a payment for items being purchased by a customer at a point of sale by sending a payment pending notification and a payment request directly to a host system.

FIG. 2 shows method 200 for making a payment for items being purchased by a customer at a point of sale by sending a payment pending notification and a payment request directly to a host system with a data transfer system. In step 202 a payment pending notification comprising an account number of the customer and a terminal identification number is acquired and sent directly to a host system. Sending directly, as used herein, means without directing or routing the information being sent to or through an EFTPOS system data transfer network. It is to be understood that information sent directly between the POS and the host system using the internet, or other public or private data transfer systems, is within the meaning of sending directly as used herein.

In at least one embodiment, the terminal identification number means that a first and a second terminal identification number are the same and referenced by the terminal identification number. In at least one other embodiment, a first and a second data transfer system may be the same and may be referenced as the data transfer system or may not need be referenced. The account number of the customer may be acquired in a variety of ways as are known in the art. In at least one embodiment of the present disclosure, the account number of the customer is acquired by electronically reading a barcode or other image and electronically acquiring the account number of the customer from the barcode or other image. In at least one embodiment of the present disclosure, the terminal identification number is stored in a POS system or an electronic payment peripheral device in data communication with the POS system. In at least one other embodiment of the present disclosure, the payment pending notification consists solely of the account number of the customer and the terminal identification number. In at least one additional embodiment, the payment pending notification is void of a personal identification number of the customer, a total cost of the items, and/or a control bank card number. In Step 204 the payment pending notification is received directly by the host system.

In Step 206, a payment request comprising a total cost of the items, the terminal identification number, a control bank card number, and optionally a personal identification number, is acquired and sent to directly the host system. The total cost of the items may be acquired by reading or scanning barcodes on the goods and/or services at the POS. The terminal identification number may be stored in a POS system or in an electronic payment peripheral device in data communication with the POS system. The control bank card number may be acquired in a variety of ways as are known in the art. In at least one embodiment, the payment request may consist solely of the total cost of the items, the terminal identification number, the control bank card number, and optionally a PIN. In at least one additional embodiment, the payment request is void of the account number of the customer and may not solely be associated with a customer. In step 208 the payment request is received directly by the host.

In Step 210, a customer's account in the host system is associated with the purchase by correlating the terminal identification number sent with the payment pending notification of Step 204 with the terminal identification number received with the payment request of Step 208, with the host system. In this embodiment, the terminal identification numbers are the same and the host system may simply match the terminal identification number sent with the payment pending notification of Step 202 with the terminal identification number sent with the payment request of Step 206 and associate the customer's account with the terminal identification number using a database function.

In Step 212 a payment decision is made using information in the customer's account, with the host system. The payment decision may be based on information in the customer's account such as a balance in the customer's account, the customer's credit limit, or verification of a PIN, for example. In Step 214, the payment decision is sent to the point of sale directly from the host system and the transaction is closed at the point of sale in Step 216.

Closing the transaction in Step 216 may further comprise debiting the customer's account and periodically crediting an account associated with the point of sale. For example, an account of the merchant receiving the payment for the purchased items may be associated with the point of sale which may be associated with the terminal identification number. Periodically crediting the merchant's, or an EFT-POS account associated with the merchant, may comprise crediting daily, hourly, or per transaction or per group of transactions, for example.

Figure 3:
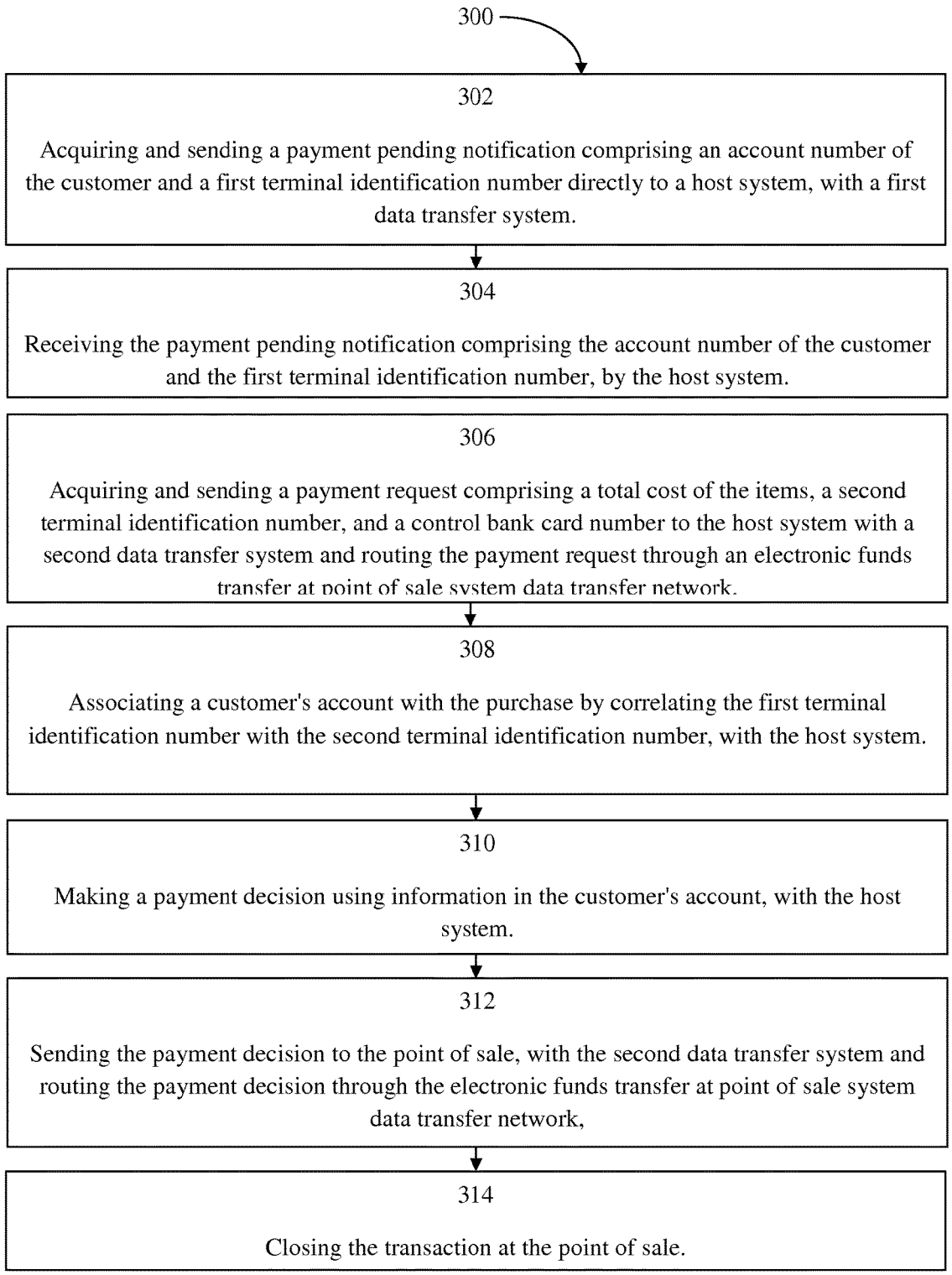
FIG. 3 is a flow diagram showing a method for making a payment for items being purchased by a customer at a point of sale using an electronic funds transfer at point of sale system data transfer network.

FIG. 3 shows method 300 for making a payment for items being purchased by a customer at a point of sale using an electronic funds transfer at point of sale system data transfer network. In step 302 a payment pending notification comprising an account number of the customer and a first terminal identification number is acquired and sent directly to a host system, with a first data transfer system. A POS system or an electronic device may send the payment pending notification directly to the host system. For example, the payment pending notification may be sent to the host system with an electronic payment peripheral device which may have the first terminal identification number stored therein. The account number of the customer may be acquired in a variety of ways as are known in the art, for example, the account number of the customer may be acquired by electronically reading a barcode or other image and electronically acquiring the account number of the customer from the barcode or other image.

In at least one embodiment of the present disclosure, the first terminal identification number is stored in a POS system or an electronic payment peripheral device in data communication with the POS system. In at least one other embodiment of the present disclosure, the payment pending notification consists solely of the account number of the customer and the first terminal identification number. In at least one additional embodiment, the payment pending notification is void of a personal identification number of the customer, a total cost of the items, and/or a control bank card number. In Step 304 the payment pending notification is received directly by the host system from the POS or electronic payment peripheral device. It is to be understood that receiving directly by the host means that the payment pending notification is not routed through an EFTPOS system data transfer network but may be received by public or private communications networks as known in the art such as the internet.

In Step 306, a payment request comprising a total cost of the items, a second terminal identification number, a control bank card number, and optionally a personal identification number, is acquired and sent to the host system, with a second data transfer system and routing the payment request through an electronic funds at point of sale data transfer network. The total cost of the items may be acquired by reading or scanning barcodes on the goods and/or services at the POS. In this embodiment of the present disclosure, the second terminal identification number may be different from the first terminal identification number and may be stored in a POS system or in an electronic payment peripheral device in data communication with the POS system. The control bank card number may be acquired in a variety of ways as are known in the art. In at least one embodiment of the present disclosure, the control bank card number is acquired by swiping or reading a magnetic stripe on a control card at the POS with a magnetic stripe reader.

In at least one embodiment of the present disclosure, the first and second terminal identification numbers are different and the payment request is routed through an EFTPOS system data transfer network when being sent from the POS system to the host system. In at least one embodiment, the payment request may consist solely of the total cost of the items, the second terminal identification number, the control bank card number, and optionally a PIN. In at least one additional embodiment, the payment request is void of the account number of the customer.

In Step 308, a customer's account is associated with the purchase by correlating the first terminal identification number with the second terminal identification number, with the host system. In the embodiment where the first and the second terminal identification numbers are different, the host system may correlate the first terminal identification number with the second terminal identification number by accessing a database having the first and second terminal identification numbers and correlating with database functions as are known in the art, and associating the customer's account with the terminal identification numbers using a database function.

In Step 310 a payment decision is made using information in the customer's account, with the host system and in Step 312, the payment decision is sent to the point of sale from the host system, with the second data transfer system. In at least one embodiment, the first and second data transfer systems are different and the payment decision is sent with the second data transfer system and routed through the EFTPOS system data transfer network, to the POS.

The transaction is closed at the point of sale in Step 314. Closing the transaction may further comprise debiting the customer's account and periodically crediting an account associated with the point of sale. For example, an EFTPOS account or an account of the merchant receiving the payment for the purchased items may be associated with the point of sale which may be associated with the first and/or second terminal identification number. Periodically crediting the merchant's or EFTPOS account may comprise crediting daily, hourly, or per transaction or per group of transactions, for example.

Figure 4:
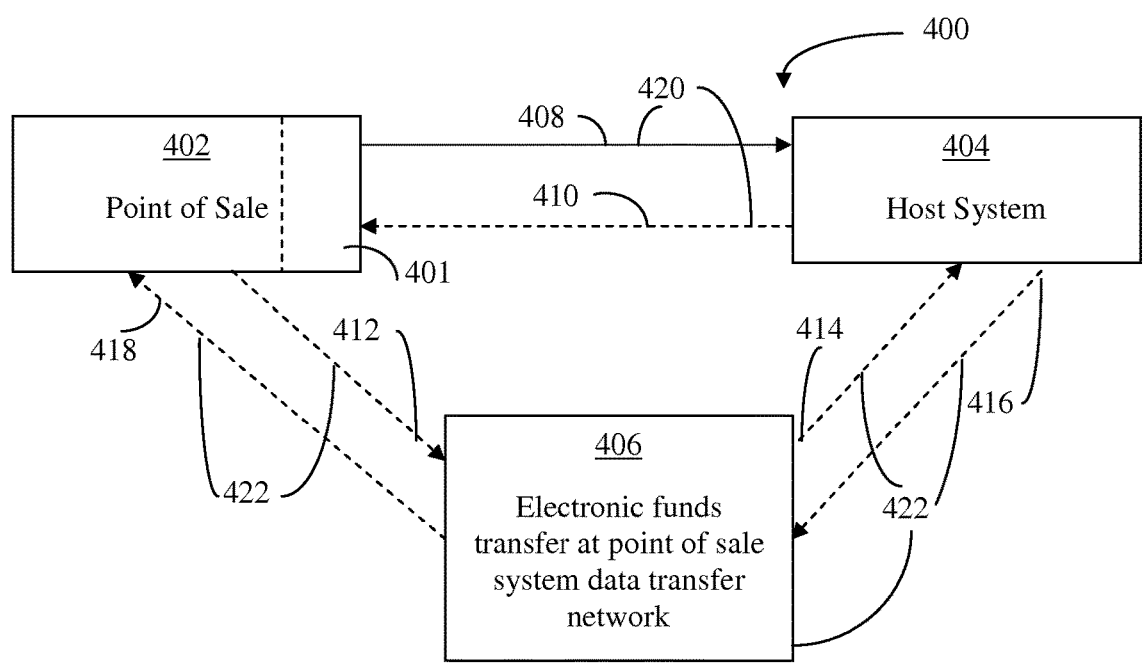
FIG. 4 is a block diagram showing a system configured for making a payment for items being purchased by a customer at a point of sale.

FIG. 4 is a block diagram showing system 400 configured for making a payment for items being purchased by a customer at a point of sale. POS system 402 may be configured to acquire a payment pending notification comprising an account number of the customer and a first terminal identification number and sent to a host system 404, with a first data transfer system 420. POS system 402 is configured to send the payment pending notification directly to host system 404 along data transfer path 408. In at least one embodiment of the present disclosure, POS system 402 is configured to acquire the customer's account number by electronically reading a barcode or other image and electronically acquiring the account number of the customer from the barcode or other image. However, POS system 402 may be configured to acquire the account number of the customer by other and different means as known in the art. For example, POS system 402 may be configured to acquire the account number of the customer with a key pad or other card data reading solutions such as RFID and smartcard chips, for example.

In at least one embodiment of the present disclosure, POS system 402 is configured to store the first terminal identification number therein. In at least one additional embodiment of the present disclosure, an electronic payment peripheral device 401 is in data communication with the POS system 402 and is configured to store the first terminal identification number therein and send the payment pending notification.

POS system 402 or electronic payment peripheral device 401 may be configured to acquire and/or send a payment request comprising a total cost of the items, a second terminal identification number, and a control bank card number to host system 402, with a second data transfer system 422 or first data transfer system 420. POS system 402 may be configured to acquire a total cost of the items by reading or scanning barcodes on the goods and/or services.

POS system 402 or electronic payment peripheral device 401 may be configured to acquire a control bank card number in a variety of ways as are known in the art. In at least one embodiment of the present disclosure, POS system 402 or electronic payment peripheral device 401 is configured to acquire the control bank card number by swiping or reading a magnetic stripe on a control card with a magnetic stripe reader. However, POS system 402 or electronic payment peripheral device 401 may be configured to acquire the control bank card number other and different ways as known in the art. For example, POS system 402 or electronic payment peripheral device 401 may be configured to acquire the control bank card number by keying in with a key pad, acquire from other card data storage solutions such as RFID and smartcard chips, or by electronically reading a barcode or other image and electronically acquiring the control bank card number from the barcode or other image, for example. In at least one embodiment, POS system 402 is configured to acquire a personal identification number, for example POS system 402 may have or be in data communication with a keypad, not shown.

The second terminal identification number may be the same or different from the first terminal identification number and may be stored in POS system 402 or in electronic payment peripheral device 401, in data communication with POS system 402. In at least one embodiment, the first and second terminal identification numbers are the same and the payment request may be sent directly to host system 404 with first data transfer system 420, along data transfer path 408. In the embodiment where the first and the second terminal identification numbers are the same, host system 404 may be configured to match the first terminal identification number with the second terminal identification number and associate the customer's account with the terminal identification number using a database function.

In at least one other embodiment, the first and second terminal identification numbers are different and POS 402 is configured to rout the payment request through an EFTPOS system data transfer network 406, through second data transfer system 422 along data paths 412 and 414 when sending to host system 404.

In at least one embodiment of the present disclosure, host system 404 is configured to associate the customer's account with the purchase by correlating the first terminal identification number with the second terminal identification number. In the embodiment where the first and the second terminal identification numbers are different and sent to the host system using both first data transfer system 420 and second data transfer system 422, the host system may be configured to correlate the first terminal identification number with the second terminal identification number by accessing a database having the first terminal identification number, the second terminal identification number, and the customer number by performing database functions as are known in the art. In at least one embodiment, host system 404 is configured to associate the customer's account with the first and second terminal identification numbers using a database function.

Host system 404 may be configured to make a payment decision using information in the customer's account. Host system 404 may be configured to make the payment decision based on information in the customer's account such as a balance in the customer's account, the customer's credit limit, or verification of a PIN, for example.

Host system 404 is configured to send a payment decision to POS system 402 with first data transfer system 420 or second data transfer system 422. In an embodiment where the first and second terminal identification numbers are the same, the payment decision may be sent directly from host system 404 to POS system 402, with first data transfer system 420 along data path 410. First data transfer system 420 may comprise data communications networks such as the internet and may not include an electronic funds transfer at point of sale system data transfer network. In an embodiment where the payment decision is sent to POS 402 with second data transfer system 422, the payment decision is routed through electronic funds transfer at point of sale system data transfer network 406 along data paths 416 and 418.

POS 402 may be configured to close the transaction upon receipt of the payment decision. Host system 404 may be configured to debit the customer's account and periodically credit an account associated with POS 402 or an account associated with the control bank card number.

Figure 5:
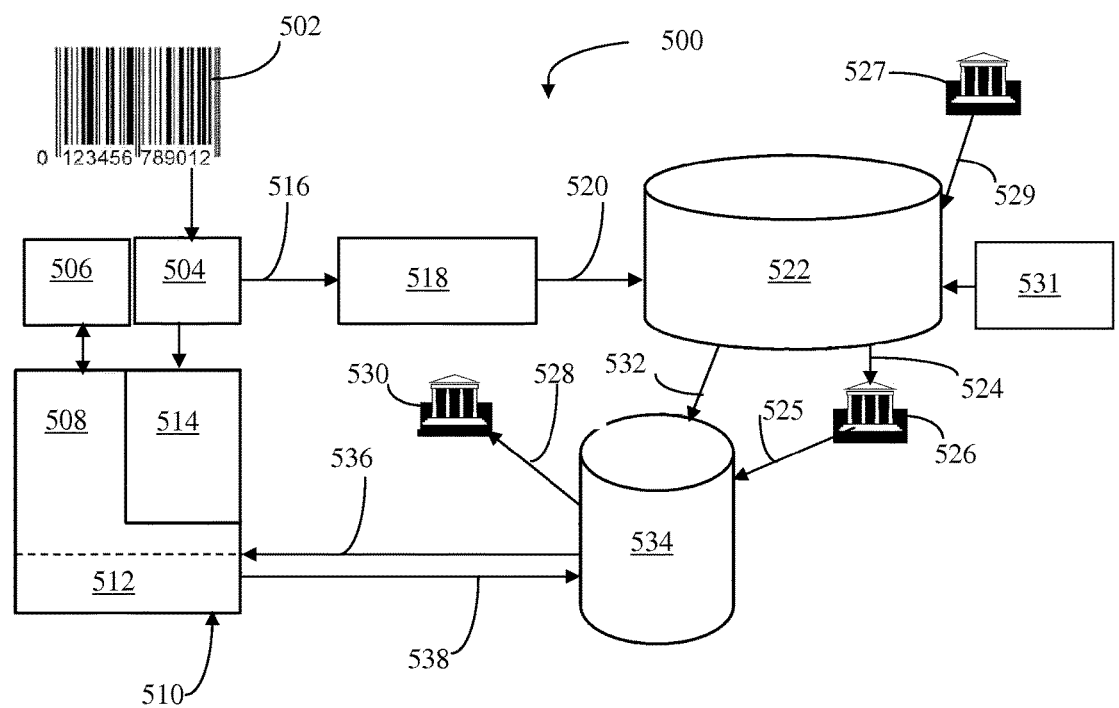
FIG. 5 is an illustration of a system having an electronic payment peripheral device.

FIG. 5 shows system 500 having an electronic payment peripheral device 518. In at least one embodiment, a method and apparatus for payment with a barcode 502 at a point of sale (POS) register 514 utilizing a barcode reader 504, a magnetic stripe debit card reader 512, and PIN pad 506. Electronic payment peripheral device 518 may comprise a microprocessor and memory which connects to barcode reader 504 and to processing host system 522 via protocols developed for acquiring barcode data from a barcode reader 504, which may be a part of a preexisting POS payment system 508 which may be either embedded in POS register 514 or as a stand-alone system, either or both may have protocols developed by an EFTPOS based system 534 for the authorization, capture, and settlement of debit or credit card payments originated using a magnetic stripe reader 512 and an existing system that may function as a secure system for the entry of a Personal Identification Number (PIN), such as PIN pad 506, by a consumer presenting barcode 502 to be read by barcode reader 504 for payment for the purchase of items, goods and/or services from a merchant or control bank card number holder.

The presently disclosed system and method may provide for using two or more transactions on separate communications networks. For example, the combination of the barcode reader 504, the electronic payment peripheral device 518, and systems using unique methods may affect an authorization, point of sale payment acceptance, and/or close of a sale on one or more communications networks. The presently disclosed method may provide for optional PIN security and the merchant payment for goods and/or services sold in a generally accepted manner of payment by an EFTPOS based system, such as EFTPOS system 534.

System 500 provides a system and method for enabling the use of barcodes 502 with barcode reader 504 integrated with merchant POS payment acceptance systems 510. In at least one embodiment of the present disclosure, an electronic payment peripheral device 518 comprises a microprocessor and memory and may be configured to store a unique terminal identification number, such as a first and/or second terminal identification number. For example, a first terminal identification and/or second terminal identification number may correspond to a merchant, POS system 510, and/or electronic payment peripheral device 518. POS register 514 may be connected to barcode reader 504 of a Barcode/POS Register system at a point of sale. In at least one embodiment of the present disclosure, barcode reader 504, pin pad 506, and/or POS system 510 may be preexisting at a point of sale.

An enrollment process of the present disclosure may comprise a consumer a means to enroll for a barcode payment service of the present disclosure. For example, the consumer may submit enrollment data to the service provider, the enrollment data including by not limited to the name, address, government identification number(s) and bank account and/or credit card bank card numbers, to be used for the payment of purchased items and the associated tax. Upon the consumer's acceptance of the terms and conditions of the barcode payment system or barcode payment service, the consumer becomes an account holder. The account holder receives a payment barcode image representation 502 of an account number assigned to the consumer by the barcode payment service provider.

A method of the present disclosure provides: at a participating merchant's store, after selecting the items, goods, and/or service to be purchased (item(s)), the account holder submits the item(s) and the payment barcode 502 to the merchant's sales clerk to be scanned by a merchant's point-of-sale barcode reader 504. The barcode reader electronically passes purchase data scanned to POS register 514 and the barcode payment account number, acquired from payment barcode 502 to electronic payment peripheral device 518. Optionally, purchase data may also be passed to electronic payment peripheral device 518 that which may log the payment barcode data and optionally the scanned purchase data. Electronic payment peripheral device 518, upon seeing and recognizing the barcode payment account number, based on a pre-established nomenclature for such account numbers; submits an electronic payment pending notification containing the scanned account number, the terminal identification stored in electronic payment peripheral device 518, and optionally purchase data to a host system 522, using the appropriate protocol of any available communications network or system 520. Sending and using the appropriate protocol of any available communications network or system 520 may be sending directly, as disclosed herein.

Upon completion of the sale item entry by the sales clerk, the sales clerk requests payment and is advised by the account holder to use the payment barcoded card number, or customer's account number, as previously barcode scanned. Through the POS system's magnetic stripe reader 512, the clerk swipes a control card having a control bank card number with a magnetic stripe conforming to the requirements of a debit EFTPOS system. The card has an encoded control bank card number conforming to the EFTPOS system standards. The card is provided through the merchant to the clerk by the barcode payment service provider. Because the POS payment system 510 may be configured to recognize the control card as a debit card, the POS payment system 510 may prompt the account holder for their PIN number.

Upon PIN entry, in an embodiment prompting the account holder for their PIN, the POS payment systems 510 electronically submits a payment request message with a terminal identification number, which may be different from the terminal identification number stored in electronic payment peripheral device 518, to the EFTPOS system 534, via data path 538. EFTPOS system 534 switches the request message to the barcode payment service provider's host system 522 which host system has received the barcode data from electronic payment peripheral device 518 in the payment pending notification. The host system recognizes the control bank card number and the terminal identification number sent from the EFTPOS, or second terminal identification number, and the terminal identification number sent from electronic payment peripheral device 518, or first terminal identification number, and uses the barcode number, or customer's account number, from electronic payment peripheral device 518 as the account number for the purpose of authorizing the transaction in accordance with barcode payment service provider agreement terms and conditions. Upon satisfaction of the standards for authorization, optionally including PIN verification, host system 522 sends a response, or payment decision, message back to EFTPOS system 534, via data path 532. EFTPOS system 534 sends the approval back to the merchant POS System 510, via data path 536, that passes the approval to POS system 510. POS system 510 closes the sale. Periodically, such as at the end of the day or at the end of a register shift, register 514 submits transactions to EFTPOS 534 for settlement, or an EFTPOS host system 534 automatically settles the transactions, via data path 538. EFTPOS system 534 debits the bank account of the barcode payment service provider host 526, via data path 525, and credits the bank account of the merchant 530, via data path 528. For example, the barcode payment service provider host system 522 may send a credit to its bank 526, via data path 524. Then EFTPOS system 534 may debit that bank account in bank 526 and credit the merchant bank 530 or the bank account of a third party merchant acquirer who may then credit the merchant. The merchant may compare the EFTPOS Payment System or may compare a third party merchant acquirer reports with the bank deposit to verify cash controls and clear EFTPOS payment receivables. The barcode payment service provider receives payment from the account holder bank 527, via data path 529. In at least one embodiment, a debit of the cardholder's or customer's checking account is made using an Automated Clearing House 527.

Presently disclosed embodiments of the present disclosure provide a method and system enabling an account holder to use a barcode to pay purchases and the merchant to be paid consistent with generally accepted and common electronic payment methods.

EXAMPLES

Figure 6A:
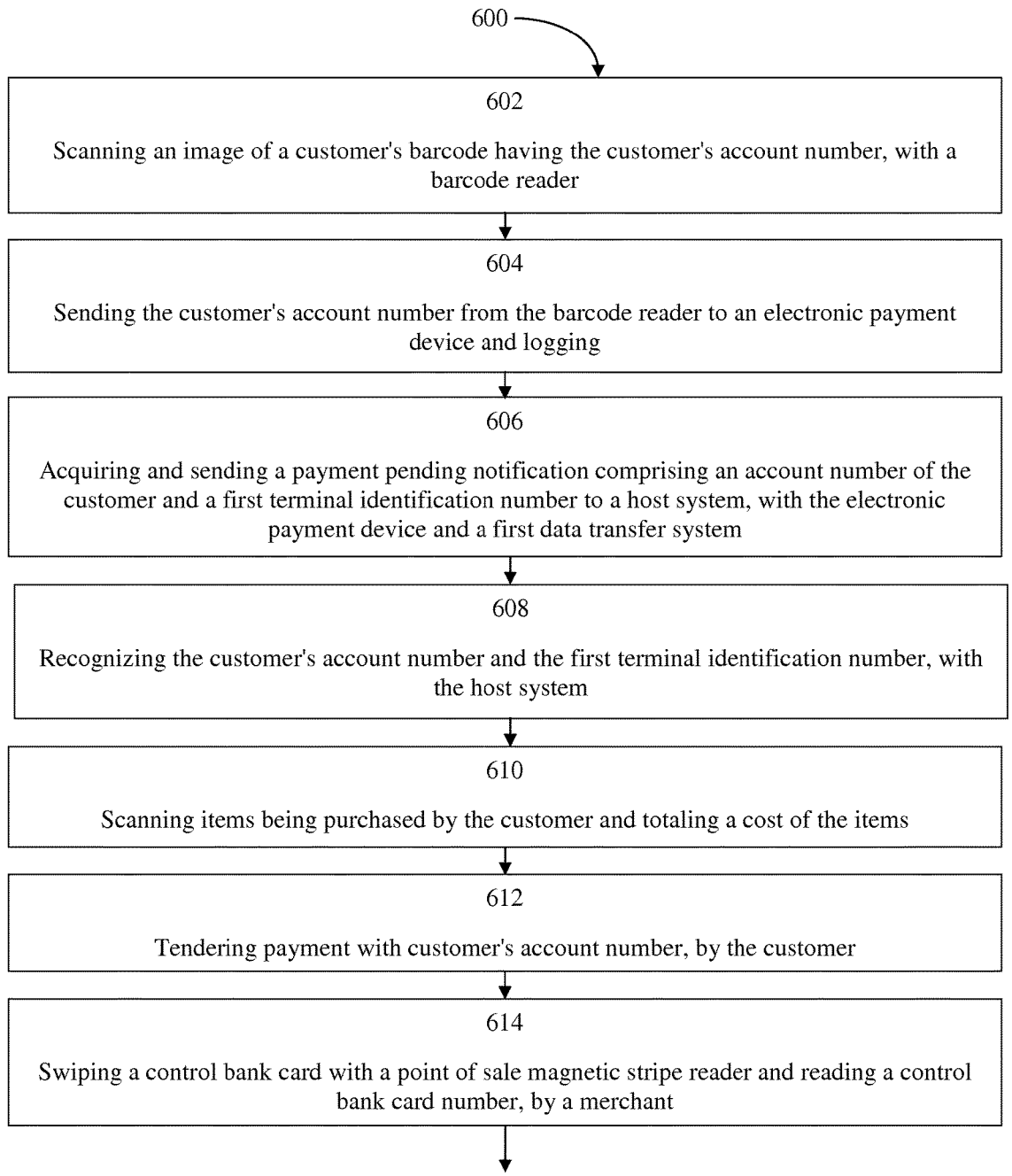
FIGS. 6A-6C is a flow diagram showing examples of making a payment for items being purchased by a customer at a point of sale.
Figure 6B:
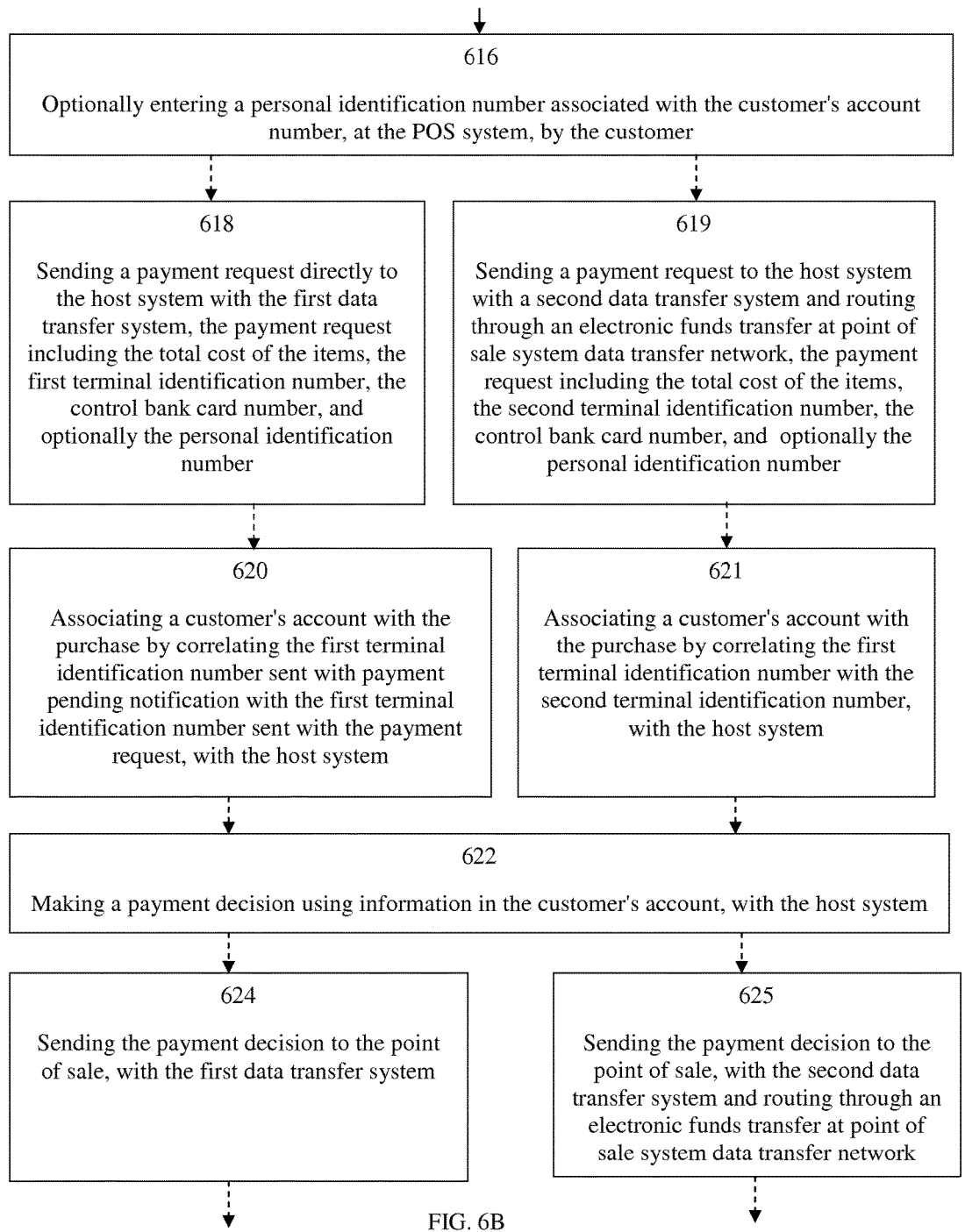
Figure 6C:
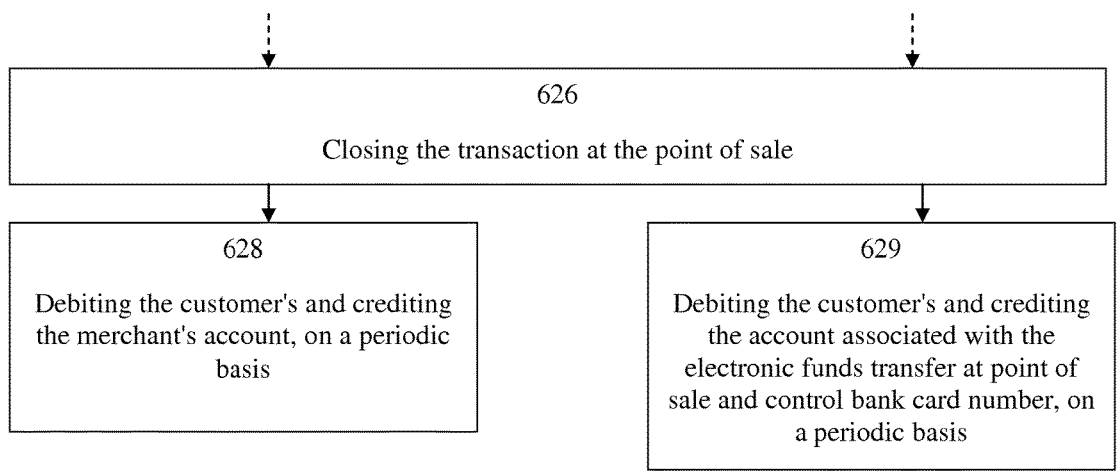

With reference to FIGS. 6A-6C, two examples of making a payment for items being purchased by a customer at a point of sale using the payment method of the present disclosure are provided. Example 1 provides an example of use of an embodiment of the present disclosure void of an EFTPOS system and Example 2 provides an example of use of an embodiment of the present disclosure using an EFTPOS system or preexisting data transfer network.

Example 1

A customer selects items to be purchased at a merchant's site. The customer presents a barcode having the customer's account number encoded therein. The merchant scans the an image of the customer's barcode having the customer's account number at Step 602. The customer's account number is sent from the barcode reader to an electronic payment peripheral device and is logged at Step 604. A payment pending notification comprising the account number of the customer and a first terminal identification number is acquired and sent to a host system, with the electronic payment peripheral device and a first data transfer system at Step 606. The first terminal identification number may be acquired by reading from the memory of the electronic payment peripheral device. The customer's account number and the first terminal identification number are recognized with the host system upon receipt at Step 608.

Items being purchased by the customer are scanned at Step 610, for example with the same or different barcode reader, and a total cost of items is acquired. Payment is tendered by the customer with the customer's account number, encoded in their barcode at Step 612. The merchant swipes their control bank card with a point of sale magnetic stripe reader and a control bank card number is read at Step 614. Optionally, a PIN may be entered by the customer at Step 616. A payment request is sent from the POS directly to a host system with the first data transfer system, the payment request includes the total cost of the items, the first terminal identification number, the control bank card number, and optionally the PIN at Step 618. The host system associates the customer's account with the purchase by correlating the first terminal identification number sent with payment pending notification with the first terminal identification number sent with the payment request at Step 620. A payment decision is made with the host system using information in the customer's account stored therein at Step 622. The payment decision is sent to the point of sale with the first data transfer system at Step 624. The transaction at the point of sale is closed at Step 626. Periodically, the customer's account is debited and the merchant's is credited at Step 628.

Example 2

A customer selects items to be purchased at a merchant's site. The customer presents a barcode having the customer's account number encoded therein. The Merchant scans an image of the customer's barcode having the customer's account number at step 602. The customer's account number is sent from the barcode reader to an electronic payment peripheral device and is logged at Step 604. A payment pending notification comprising the account number of the customer and a first terminal identification number is acquired and sent to a host system, with the electronic payment peripheral device and a first data transfer system at Step 606. The first terminal identification number may be acquired by reading form the memory of the electronic payment peripheral device. The customer's account number and the first terminal identification number are recognized with the host system at Step 608.

Items being purchased by the customer are scanned, for example with the same or different barcode reader, and a total cost of items is acquired at Step 610. Payment is tendered by the customer with the customer's account number, encoded in their barcode, at Step 612. The merchant swipes their control bank card with a point of sale magnetic stripe reader and a control bank card number is read at Step 614. Optionally, a PIN may be entered by the customer at Step 616. A payment request is sent from the POS to a host system with a second data transfer system and is routed through a preexisting electronic funds transfer at point of sale system data transfer network, the payment request includes the total cost of the items, a second terminal identification number, the control bank card number, and optionally the personal identification number, at Step 619. At Step 621 the host system associates the customer's account in the host system with the purchase by correlating the first terminal identification number, sent with the payment pending notification at Step 606, with the second terminal identification number, sent with the payment request at Step 619. A payment decision is made with the host system using information in the customer's account at Step 622. The payment decision is sent to the point of sale with the second data transfer system and routed through the EFTPOS system data transfer network at Step 625. The transaction at the point of sale is closed at Step 626. Periodically, the customer's account is debited and a Merchant bank account associated with the EFTPOS system and terminal identification number is credited at Step 629.

In at least one embodiment of the present disclosure, a method for making payments for items being purchased by customers at points of sale is provided. Each purchase by each customer at each point of sale comprising the steps of: a) acquiring and sending a payment pending notification comprising an account number of the customer and a first terminal identification number to a host system, with a first data transfer system; b) acquiring and sending a payment request comprising a total cost of the items, a second terminal identification number, and a control bank card number to the host system, with a second data transfer system; c) associating a customer's account with the purchase by correlating the first terminal identification number with the second terminal identification number, with the host system; d) making a payment decision using information in the customer's account, with the host system; e) sending the payment decision to the point of sale, with the second data transfer system; and f) closing the transaction at the point of sale. Each account number of each customer may be different and each first terminal identification number may be the same for each same point of sale and may be different for each different point of sale. Each control bank card number may be the same and each second terminal identification number may be the same for each same point of sale and may be different for each different point of sale. In at least one embodiment, a plurality of control bank card numbers are the same. However, it is to be understood that one or more different bank card numbers are within the scope of the present disclosure. Acquiring and sending a payment request may comprise sending directly to the host system and the sending of the payment decision may comprise sending directly to the point of sale, and the first data transfer system and the second data transfer systems may be the same. In at least one embodiment, the step of acquiring and sending the payment pending notification comprises sending directly to the host system, and the steps of acquiring and sending the payment request and sending the payment decision comprise routing through an electronic funds transfer at point of sale system data transfer network, the first data transfer system and the second data transfer systems are different. It is to be understood, that the scope of the present disclosure enables one skilled in the art to rout a portion of the payment requests through an electronic funds transfer at point of sale system data transfer network and send another portion of the payment requests directly to the host system. One or more payment pending notification may be void of at least one of a personal identification number of the customer, the control bank card number, and the total cost of the items. One or more payment requests may be void of the account number of the customer.

The invention is illustrated by example in the drawing figures, and throughout the written description. It should be understood that numerous variations are possible while adhering to the inventive concept. Such variations are contemplated as being a part of the present disclosure.

The invention claimed is:

1. A method for making a payment by a customer at a point of sale comprising the steps of:
   a) presenting an object bearing a loyalty program identification by the customer, wherein the loyalty program identification is associated with an account number of the customer;
   b) acquiring and sending a payment pending notification comprising the account number of the customer and a first terminal identification number, identifying the point of sale, to a host system, with a first data transfer system comprising a communications network and being configured to acquire and send the payment pending notification to the host system;
   c) receiving the payment pending notification with the host system;
   d) choosing to use the presented loyalty program identification for making the payment, by the customer;
   e) acquiring a payment request comprising a total payment due, a second terminal identification number, identifying the point of sale, and a control bank number, the control bank number being a number different than the account number of the customer and the same for all of the points of sale and for each payment request being sent, the control bank number enabling the payment request to be sent through an electronic funds transfer at point of sale system data transfer network to the host system, with a second data transfer system;
   f) sending the payment request through the electronic funds transfer at point of sale system data transfer network to the host system, with the second data transfer system;
   g) receiving the payment request with the host system;
   h) associating a customer's account, linked with the customer's account number, with the purchase by correlating the first terminal identification number with the second terminal identification number, with the host system;
   i) making a payment decision using information in the associated customer's account, with the host system, wherein the host system comprises a microprocessor, memory, and a database function configured to correlate the first and second terminal identification numbers and associate the customer's account with the customer;
   j) sending the payment decision to the point of sale, from the host system through the electronic funds transfer at point of sale system data transfer network with the second data transfer system;
   k) receiving the payment decision at the point of sale;
   l) closing the transaction at the point of sale; and
   wherein the second data transfer system is a communications network having an electronic funds transfer at point of sale system data transfer network and is configured to acquire and send the payment request from the point of sale to the host system and to acquire and send the payment decision from the host system to the point of sale.

2. The method of claim 1 wherein the step of acquiring and sending the payment pending notification comprises electronically reading a barcode or other image, with a barcode or image reader, and electronically acquiring the account number of the customer from the barcode or other image.

3. The method of claim 1 wherein the payment pending notification is void of a personal identification number of the customer.

4. The method of claim 1 wherein the payment request is void of the account number of the customer.

5. The method of claim 1 wherein the step of acquiring and sending a payment request further comprises acquiring and sending a personal identification number of the customer.

6. The method of claim 1 further comprising the steps of:
j) debiting the customer's account; and
k) crediting an account associated with the point of sale.

7. The method of claim 2 wherein the step of presenting a loyalty program identification by the customer comprises electronically rendering the barcode or other image with a portable electronic device.

8. The method of claim 1 wherein the payment pending notification consists solely of the account number of the customer and the first terminal identification number.

9. The method of claim 6 wherein the steps of debiting the customer's account and crediting an account associated with the point of sale are performed with the host system.

10. The method of claim 1 wherein the step acquiring and sending a payment request comprises rendering a control bank card, the control bank card comprising an RFID, smartcard chip, or other card data storage solution configured to store and render the control bank card number.

* * * * *